United States Patent [19]
Kubo et al.

[11] 3,766,462
[45] Oct. 16, 1973

[54] RAPID FEED CONTROL FOR AN ELECTRIC STEP MOTOR

[75] Inventors: Moritada Kubo, Tokyo; Yukiharu Takahashi, Yokohami, both of Japan

[73] Assignee: Tokyo Shibaura Electric Company, Limited, Kawasaki-shi, Japan

[22] Filed: Dec. 30, 1971

[21] Appl. No.: 214,308

[30] Foreign Application Priority Data
Dec. 30, 1970 Japan............................ 45/122943

[52] U.S. Cl................................ 318/696, 318/685
[51] Int. Cl. .......................................... H02k 37/00
[58] Field of Search.................... 318/138, 254, 696, 318/685

[56] References Cited
UNITED STATES PATENTS
3,374,410  3/1968   Cronquist et al. ................. 318/685
3,582,751  6/1971   Rosshirt............................ 318/696
3,466,517  9/1969   Leenhouts ..................... 318/696 X
3,463,985  8/1969   Fredriksen...................... 318/685 X
3,482,155  12/1969  Fredriksen...................... 313/685 X
3,586,953  6/1971   Markhaven....................... 318/685

Primary Examiner—G. R. Simmons
Attorney—Norman F. Oblon et al.

[57] ABSTRACT

An electric step motor is energized from a variable frequency pulse generator such that feed pulses of a gradually increasing frequency are applied to the step motor during the starting thereof and feed pulses of a gradually decreasing frequency are applied to the step motor during a reduction in the speed thereof. A frequency divider is provided for obtaining a value corresponding to one half or N/2 of a total feed of pulses N. A register is also provided for storing pulses $N_m$ which correspond to the number of feed pulses present during an interval for controlling the step motor from a maximum speed to a minimum one. A digital comparator is provided for comparing the content of the register with the output of the frequency divider and in accordance therewith controls the variable frequency pulse generator and hence provides a speed reduction in the electric step motor.

4 Claims, 8 Drawing Figures

RAPID FEED CONTROL FOR AN ELECTRIC STEP MOTOR

BACKGROUND OF THE INVENTION

1. Field of the Invention

The present invention relates to a rapid feed control for an electric step motor which drives a feed mechanism of a numerically controlled machine tool.

2. Description of the Prior Art

The existence of an electric step motor which rotates by a defined rotational angle upon the receipt of an electric pulse which is supplied for driving the step motor is well known. It is also well known that such a step motor is capable of regularly maintaining its angular position in response to a given number of feed pulses, and as a result thereof, such a step motor has been widely utilized for driving the feed mechanism of a numerically controlled machine tool.

Generally, the electric step motor, as described above, is energized by the electric pulses from a variable frequency pulse generator. Upon the starting of the step motor the pulse generator will firstly emit pulses of a self startable frequency. The terminology self startable frequency means a frequency at which the step motor can be started without any slip. Secondly, the pulse generator is controlled such that the output frequency thereof is increased from the self startable frequency to a desired maximum frequency in order to increase the rotational speed of the step motor to a desired value. The maximum output frequency of the pulse generator is then maintained until a speed reduction control signal is supplied thereto. The pulses emitted from the pulse generator are also fed to a subtracting counter in which a predetermined number of pulses that corresponds to a total feed are preset. The pulses stored in the subtracting counter are reduced to a predetermined number during an interval wherein the step motor will reduce its speed from a maximum value to a minimum value. At such time, a speed reduction control will be fed to the subtracting counter to thereby cause the speed of the step motor to reduce.

Referring now to FIGS. 1a, 1b and 1c, three different modes of operation of the pulse generator which respectively correspond to three different running schedules for the step motor are shown with the abscissa representing time and the ordinate representing frequency. Also in the same figures, $F_o$ represents a self startable frequency which is inherent with the step motor and $F_m$ is the maximum frequency which is generated by the variable frequency pulse generator.

More particularly, referring to FIG. 1a, it is seen that in this mode the total feed pulses N for the step motor, which are expended for reducing the motor speed from the maximum value which corresponds to the frequency $F_m$ to the minimum value which corresponds to the self startable frequency $F_o$, are more than twice as much as the pulses $N_m$. Thus, when the pulse generator is started at a time $t_1$, the output frequency increases gradually from the self startable frequency to the maximum desired frequency, and then the maximum output frequency is held until a speed reduction control signal is applied to the pulse generator at a time $t_2$. After the time $t_2$, the pulse generator, at a time $t_3$, reduces its output frequency from the maximum value to the minimum self startable frequency. At the time $t_3$, a stop control signal is supplied to the pulse generator to stop the output thereof. The step motor can thus be run along the time-frequency curve from $t_1$ to $t_3$.

The mode of operation of FIG. 1b shows that the total feed pulses N are equal to the pulses $2N_m$, where $N_m$ represents the number of pulses required for reducing the motor speed from the maximum value to the minimum value. In this case, as soon as the motor speed reaches the frequency $F_m$, the pulse generator is controlled so as to reduce the frequency thereof from $F_m$ to $F_o$.

With regard to the present invention, it is most important to consider the mode of operation of FIG. 1c wherein the total feed pulses N are smaller than the pulses $2N_m$, where $N_m$ represents the number of pulses required to reduce the motor speed down from the maximum value to the minimum value corresponding to the self startable frequency $F_o$. A main problem with this mode of operation is that the speed reduction of the step motor will begin before the maximum frequency $F_m$ of the pulse generator is reached, since the remaining pulses required for reduction of the motor speed will become equal to the pulses $N_m$ as soon as the motor starts.

SUMMARY OF THE INVENTION

It is therefore an object of the present invention to provide a new and improved unique rapid feed control for an electric step motor wherein a rapid feed for the step motor can always be achieved independently of the amount of feed.

Another object of the present invention is to provide a new and improved unique rapid feed control for an electric step motor in which a half of the total feed pulses is compared with the amount of pulses required for reducing the motor speed from a maximum to a minimum value.

Briefly, in accordance with one aspect of the present invention, these and other objects are achieved by providing a variable frequency pulse generator having an output thereof which is coupled to an electric step motor in order to drive the same at a desired rotational speed. A subtracting counter is provided and the same is prestored with electric pulses corresponding to a predetermined amount of feed of the step motor. An electric pulse is subtracted from the pulses prestored in the subtracting counter each time that an electric driving pulse is fed to the step motor. A frequency divider is provided for dividing the pulses corresponding to the predetermined amount of feed of the step motor into one half thereof. A pulse setting device is provided for presetting electric pulses therein which correspond to the amount of pulses required during an interval wherein the motor speed is reduced down from the maximum value to the minimum value which corresponds to the self startable frequency of the step motor. A digital comparator is also provided for generating an output signal in response to the difference between the outputs of the frequency divider and the pulse setting device. A logic circuit device is provided for obtaining a speed reduction signal which is fed to the variable frequency pulse generator in response to a coincidence in the output signal from the comparator and that of the subtracting counter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Figure 3:
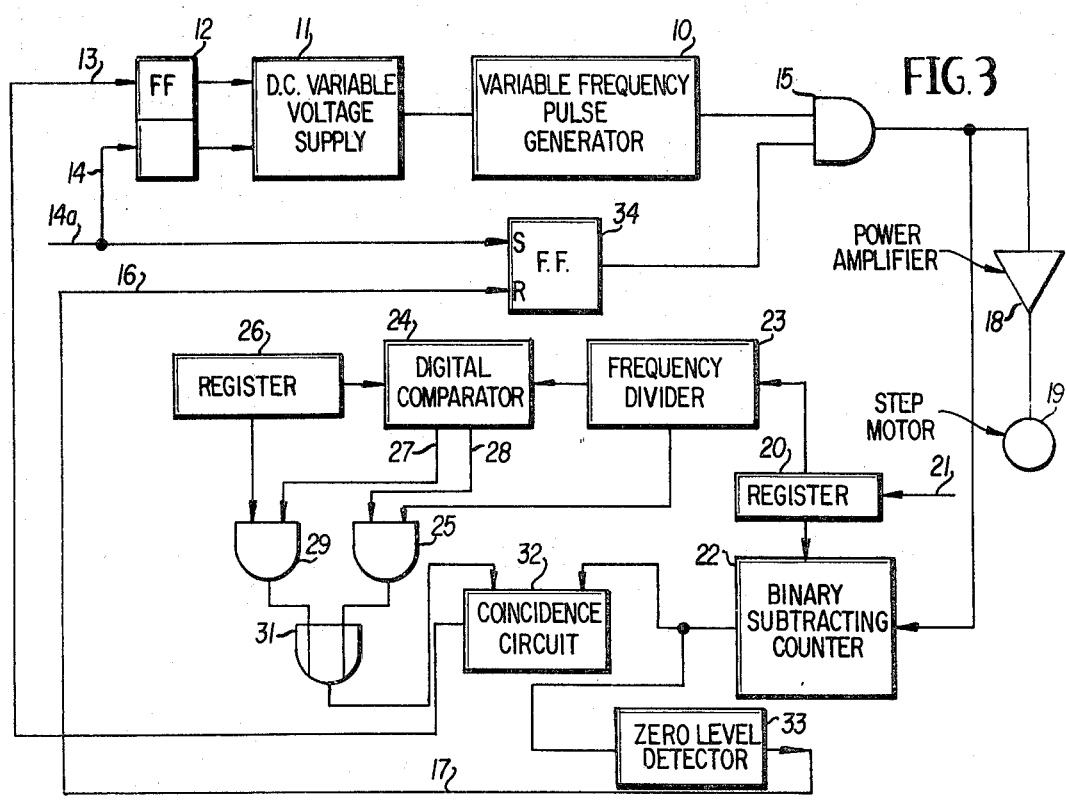
FIG. 3 is a block diagram of a preferred embodiment of a rapid feed control for an electric step motor in accordance with the present invention.

Referring now to FIG. 3, the rapid feed control of the present invention is shown as including a frequency pulse generator generally shown with a reference numeral 10. The frequency pulse generator 10 may be composed of a conventional relaxation oscillator, a C-R oscillator, or the like. Conventionally, it should be understood that at least one transistor (not shown) is connected in parallel with a resistor of the oscillator to thereby enable the resultant resistance value thereof to be varied in order to obtain a variable frequency output from the oscillator. The variable frequency output from the oscillator may be obtained by varying the base voltage of the transistor. Such oscillators, as described above, are also conventionally known as voltage-frequency converters or V-F converters.

In order to drive the V-F converter or the pulse generator 10, as described above, a conventional D.C. variable voltage supply 11 is provided and the same may be constructed of a C-R charge and discharge circuit whose time constant may be controlled by transistors (not shown). In order to provide the charge and discharge signals to the variable voltage supply 10, a flip-flop circuit 12 is provided and the same has a pair of inputs 13 and 14. The input 14 is employed for receiving a signal thereon to cause the flip-flop 12 to take a state such as to charge up the capacitor of the D.C. voltage supply 11 so that the output frequency from pulse generator 10 is increased. The input 13 is employed for receiving a signal thereon to cause the flip-flop 12 to take a state such as to discharge the capacitor of the D.C. variable voltage supply 11 so that the output frequency from pulse generator 10 is decreased.

The output signal from the pulse generator 10 is connected to one input of an AND gate 15. The other input of the AND gate 15 is connected to one output terminal of a flip-flop 34. The flip-flop 34 will provide a logical "1" on the output thereof when a start signal is applied on an input 14a thereof which is in turn connected to the input 14 of the flip-flop 12. The flip-flop 34 will change from a logical "1" to a logical "0" when a stop or reset signal is applied to the other input terminal 16 thereof through a conductor 17.

When a logical "1" appears on both inputs of the AND gate 15, the AND gate 15 will allow the output pulses from the pulse generator 10 to pass to a power amplifier 18 which energizes an electric step motor 19.

A register 20 is provided for storing the member of feed pulses N which correspond to the desired amount of feed of the pulse motor 19. The register 20 memorizes the feed pulses when the start signal, as described above, is applied to a control terminal 21 thereof.

The content of the register 20 is transferred into a binary subtracting counter 22 and one pulse is subtracted therefrom every time a feed pulse is applied to the pulse motor 19. The content of the register 20 is also conducted to a frequency divider 23 wherein the total feed pulses N are divided by two. The divided pulses, N/2, are then applied to one input of a digital comparator 24, as well as to one input of an AND gate 25. A register 26 is provided for storing the number of pulses $N_m$ which correspond to those present during the reduction from the maximum speed of the step motor 19 to the minimum speed which corresponds to the self startable frequency $F_0$ of the step motor 19. The digital comparator 24 may be of the type designated DM 7200 and which is disclosed in a catalogue entitled "Digital Integrated Circuits" issued in the U.S.A. in 1971 by the National Semiconductor Corporation.

The digital comparator 24 compares the content N/2 of the frequency divider 23 with the content $N_m$ of the register 26, and generates a logical "1" on a terminal 27 thereof and a logical "0" on a terminal 28 thereof when the content N/2 is greater than the content $N_m$. On the other hand, the comparator 24 generates a logical "1" on the terminal 28 and a logical "0" on the terminal 27 when the content N/2 is less than or equal to the content $N_m$, namely when $N/2 \leq N_m$.

The output signals from the digital comparator 24 are selectively applied to one terminal of AND gates 29 and 25.

AND gate 29 allows the signals representative of $N_m$ from the register 26 to pass therethrough when the content N/2 is greater than the content $N_m$, while the AND gate 25 passes the signals representative of N/2 from the frequency divider 23 therethrough when N/2 is less than or equal to $N_m$. The signals passed through either the AND gate 29 or 25 is conducted through an OR gate 31 to one input of a coincidence circuit 32. The other input to the circuit 32 is connected to the output terminal or the binary subtracting counter 22. Thus, when both of the input signals of the circuit 32 coincide with each other, a speed reduction signal is generated therefrom and forwarded to the input 13 of the flip-flop 12 so that speed reduction of the step motor 19 can be made.

A zero-level detector 33 is provided for generating a stop signal to reset the flip-flop 34 and to close the AND gate 15 to thereby stop the step motor 19 when the binary feed pulses stored in binary subtracting counter 22 are reduced to zero.

Figure 1A:
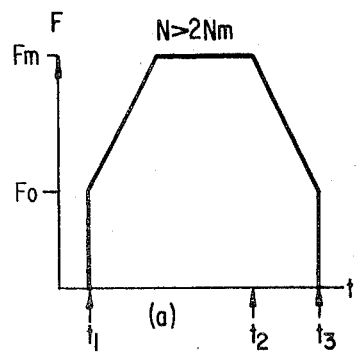
FIGS. 1a, 1b and 1c are diagrams of curves showing three prior art modes of operation of an electric step motor.
Figure 2A:
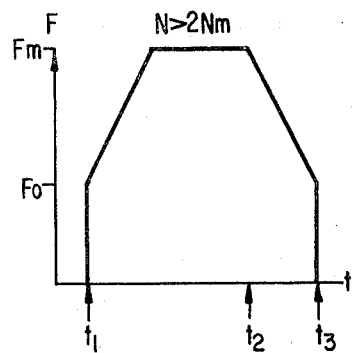
FIGS. 2a, 2b and 2c are similar diagrams of curves showing three modes of operation of an electric step motor in accordance with the present invention.

In operation of the present invention, let us assume that the total feed pulses N are greater than $N_m$, as described above. When it is intended to start the pulse motor 19, a start signal is supplied to the register 20 to set the amount of feed of the motor 19 therein. At the same time the start signal is supplied to the set terminal 14 of the flip-flop 12 and to the set terminal 14a of the flip-flop 34. The pulse generator 10 will then increase its frequency from $F_0$ to $F_m$ as shown in FIG. 2a. It is seen that FIG. 2a is the same as that of FIG. 1a. The maximum frequency $F_m$ is then held.

At the same time as the foregoing the content N of the register 21 is divided by the frequency divider 23 into N/2, and is memorized as a binary code in the binary subtracting counter 22. This is required to satisfy the relationship $N > 2N_m$.

Accordingly, since N/2 is greater than $N_m$, the terminal 27 of the comparator 24 will become a logical "1" and a signal corresponding to $N_m$ will be fed from the register 26 to the coincidence circuit 32 through the AND gate 31. On the other hand, the content of the binary subtracting counter 22 will be reduced as pulses are fed to the step motor 19. As long as the output signals from the binary subtracting counter 22 exceed the signal corresponding to $N_m$ from the register 26, the step motor 19 will run at a maximum speed corresponding to the maximum frequency $F_m$.

When the content of the binary subtracting counter 22 becomes equal to the signal corresponding to $N_m$ from the register 26, a speed reduction signal will be emitted from the coincidence circuit 32 and applied to the reset terminal 13 of the flip-flop 12 to cause the frequency of the pulse generator 10 to reduce from the maximum frequency $F_m$ to the minimum frequency $F_o$ so that the step motor 19 will reduce its speed down along the inclination shown in FIG. 2a.

The motor 19 can be finally stopped when the content of the counter 22 becomes null or zero by a stop signal supplied from the zero-level detector 33 to the reset terminal 16 of the flip-flop 34.

Figure 1B:
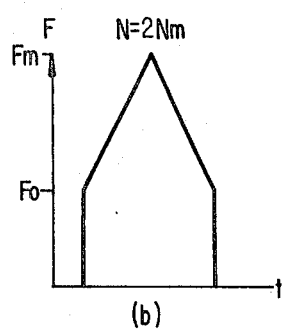
Figure 1C:
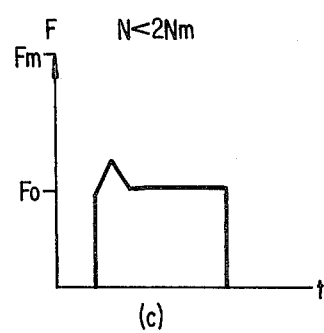
Figure 2B:
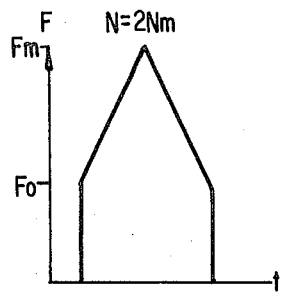

The mode of operation of FIG. 2b which is seen as having no horizontal portion on the curve can be easily understood from the above and is the same as that of FIG. 1b.

Figure 2C:
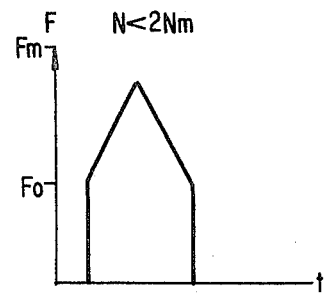

Now, when the total feed N is less than twice as much as $N_m$, as shown in FIG. 2c, the comparator 24 will provide a logical "1" on the output terminal 28 and provide a logical "0" on the terminal 27. Accordingly, the value $N_m$ is altered by N/2 and is supplied to the coincidence circuit 32, so that the speed of the step motor 19 can be raised so long as the upper limit thereof is below $N_m$. A decrease in the speed of the motor can be started when the content of the binary subtracting counter becomes N/2.

Thus, it is seen that in accordance with the present invention, the step motor 19 can be rotated at as high a speed as possible even when the total feed N is less than twice as much as $N_m$, and accordingly a rapid feed control for the step motor can be effectively provided.

Figure 4:
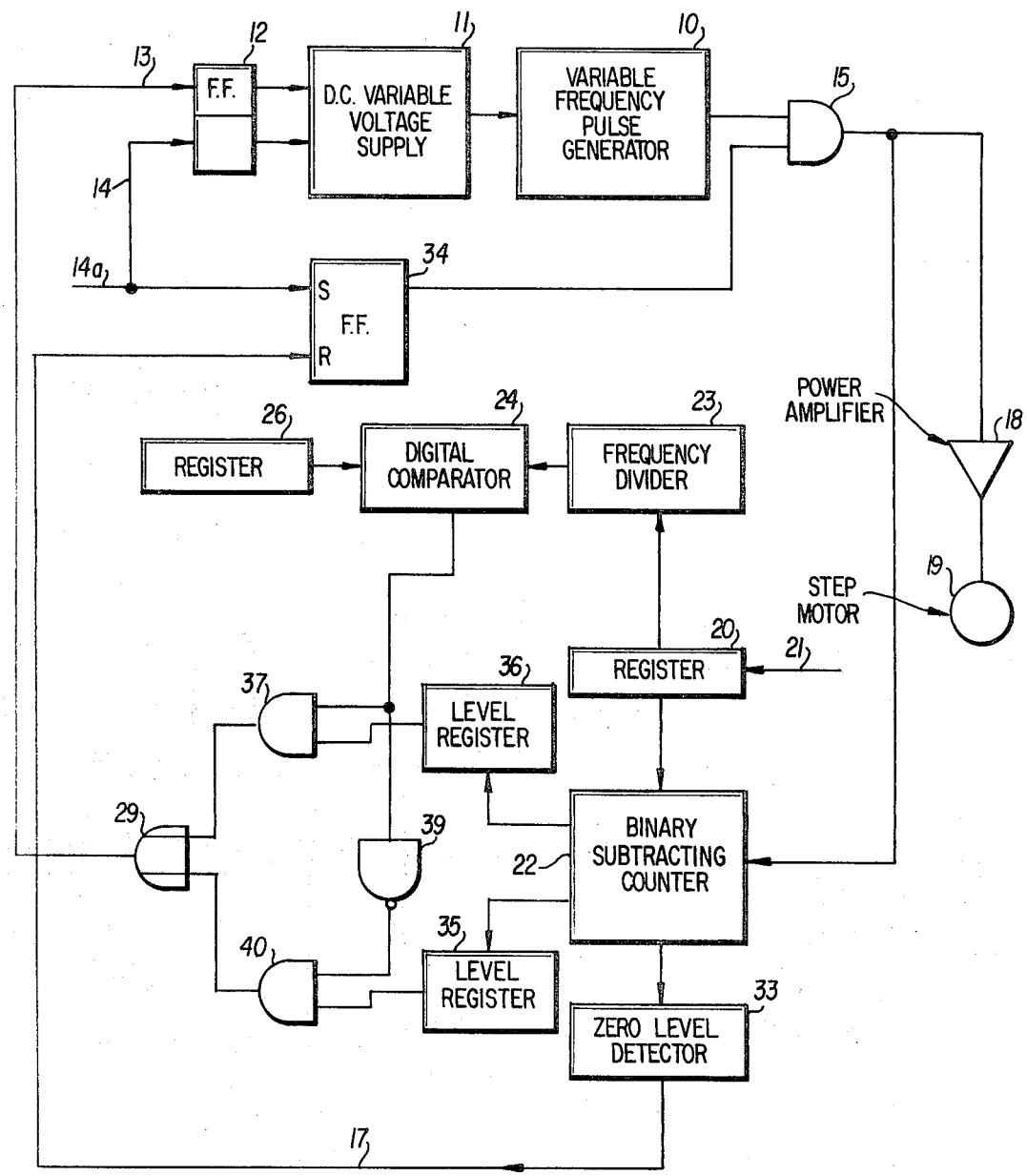
FIG. 4 is a block diagram of another preferred embodiment of a rapid feed control for an electric step motor in accordance with the present invention.

Referring now to FIG. 4, another preferred embodiment is shown in which the same or identical parts are designated with the same reference numerals as those of FIG. 3. In the embodiment of FIG. 4, the coincidence circuit 32 of FIG. 3 has been replaced by level registers 36 and 35. The register 36 detects when the binary subtracting counter 22 has reached the value $N_m$ which corresponds to the feed pulses during the interval wherein the frequency is reduced from the maximum value $F_m$ to the self startable value $F_o$. The register 36 will emit a signal therefrom when the value $N_m$ has been detected. On the other hand, the register 35 detects when the binary subtracting counter 22 has reached a value of one half that of the total feed N/2, and the same will emit a signal therefrom.

The digital comparator 24 will provide a logical "1" at the output thereof if N/2 is greater than $N_m$, and when $N_m$ is detected by the register 36, an AND gate 37 will emit a speed reduction signal therefrom. The signal from the AND gate 37 will pass through an OR gate 38 to the reset terminal 13 of the flip-flop 12 so that the speed of the step motor 19 will be reduced.

On the other hand, the digital comparator 24 will provide a logical "0" at the output thereof if N/2 is less than $N_m$. Under such conditions the AND gate 37 will remain closed and a NAND gate 39 will change its output state from a logical "0" to a logical "1." Thus, when the value N/2 is detected by the register 35 to provide a signal therefrom, an AND gate 40 will allow the speed reduction signal to pass through the OR gate 38 to the reset terminal 13 of the flip-flop 12 so that the step motor speed is reduced.

From the above, in accordance with the teachings of the present invention, it will be understood that a step motor can be run with as high a speed as desired even if the total feed pulses are less than twice as much as the pulses during the interval wherein the step motor speed is reduced down from the maximum to the minimum. Accordingly, it is possible to provide a rapid feed control for a step motor with a high efficiency.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rapid feed control for an electric step motor comprising:

a variable frequency pulse generator having an output thereof for connection to an electric step motor in order to drive the same at a desired rotational speed;

subtracting counter means for prestoring a number corresponding to a total number of feed pulses for said step motor, said subtracting counter means subtracting one from said number in response to each pulse fed to said step motor;

divider means for dividing by two said total number of feed pulses, first register means for prestoring a number corresponding to the number of pulses required to reduce the speed of said motor from a maximum to a predetermined minimum;

digital comparator means for generating a particular output signal in response to a difference between an output of said divider means and an output of said first register means; and, logic circuit means for obtaining a speed reduction signal to be fed to said pulse generator in response to the output signal from said digital comparator means and a predetermined subtraction signal from said subtracting counter means.

2. A rapid feed control for an electric step motor according to claim 1, wherein said logic circuit device includes:

means for generating a comparison signal corresponding to the lesser of one half of said total number of feed pulses or said number of pulses required to reduce the speed of said motor from said maximum to said predetermined minimum; and, a coincidence circuit for detecting a coincidence between said comparison signal and the content of said subtracting counter and for emitting a motor speed reduction signal therefrom.

3. A rapid feed control for an electric pulse motor according to claim 1, wherein said logic circuit device includes:

second register means connected to an output of said subtracting counter means for detecting when said subtracting counter means has counted down to said number prestored in said first register means, and, third register means connected to another output of said subtracting counter for detecting when half of said total number of feed pulses has been fed to said step motor and for providing an output corresponding thereto;

the output signal $s$ from said second register means being combined in a first AND gate with the output signal from said digital comparator means to provide a speed reduction signal for the step motor, and the output signal from said third register means being combined in a second AND gate with the output signal of said digital comparator means through a NAND gate to provide an alternative speed reduction signal for the step motor.

4. A rapid feed control for an electric step motor as in claim 1, wherein said logic circuit device includes:

first AND gate means coupled to said first register means and to said digital comparator means, second AND gate means coupled to said divider means and to said digital comparator means; and, OR gate means coupled to the outputs of said first and second AND gate means.

* * * * *